US009091228B2

(12) United States Patent
Xiao et al.

(10) Patent No.: US 9,091,228 B2
(45) Date of Patent: Jul. 28, 2015

(54) METHOD OF CONTROLLING A DIESEL ENGINE

(75) Inventors: Yun Xiao, Ann Arbor, MI (US); Steven J. Andrasko, Oshkosh, WI (US); Chad E. Marlett, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 635 days.

(21) Appl. No.: 13/446,088

(22) Filed: Apr. 13, 2012

(65) Prior Publication Data

US 2013/0269654 A1    Oct. 17, 2013

(51) Int. Cl.
*F02D 41/22* (2006.01)
*F02D 31/00* (2006.01)
*F02D 41/00* (2006.01)

(52) U.S. Cl.
CPC ............ *F02D 41/221* (2013.01); *F02D 31/006* (2013.01); *F02D 41/0055* (2013.01); *F02D 41/0077* (2013.01); *F02D 2041/0017* (2013.01); *Y02T 10/47* (2013.01)

(58) Field of Classification Search
CPC ... F02D 17/04; F02D 41/221; F02D 41/0055; F02D 41/0077; F02D 31/006
USPC ................ 123/330, 332, 397, 198 D, 198 DB
See application file for complete search history.

(56) References Cited

U.S. PATENT DOCUMENTS

| 3,433,209 | A | * | 3/1969 | Freitag ........................ 123/198 R |
| 3,735,742 | A | * | 5/1973 | Aono et al. ..................... 123/333 |
| 3,828,742 | A | * | 8/1974 | Weis ............................. 123/351 |
| 2008/0276914 | A1 | * | 11/2008 | Bleile et al. ............... 123/568.11 |

* cited by examiner

*Primary Examiner* — Hieu T Vo
*Assistant Examiner* — Sherman Manley
(74) *Attorney, Agent, or Firm* — Quinn Law Group, PLLC

(57) ABSTRACT

A method of controlling a diesel engine includes sensing a speed of the diesel engine, and closing a throttle of the diesel engine when the sensed speed of the diesel engine is equal to or greater than a maximum allowable engine speed to prevent oxygen from entering an intake manifold of the diesel engine, thereby preventing combustion and stopping the operation of the diesel engine. An Exhaust Gas Recirculation (EGR) valve is actuated to regulate circulation of exhaust gas from the diesel engine through the intake manifold to control pressure within the intake manifold to prevent damage to other engine components from excessive positive or negative pressure.

17 Claims, 2 Drawing Sheets

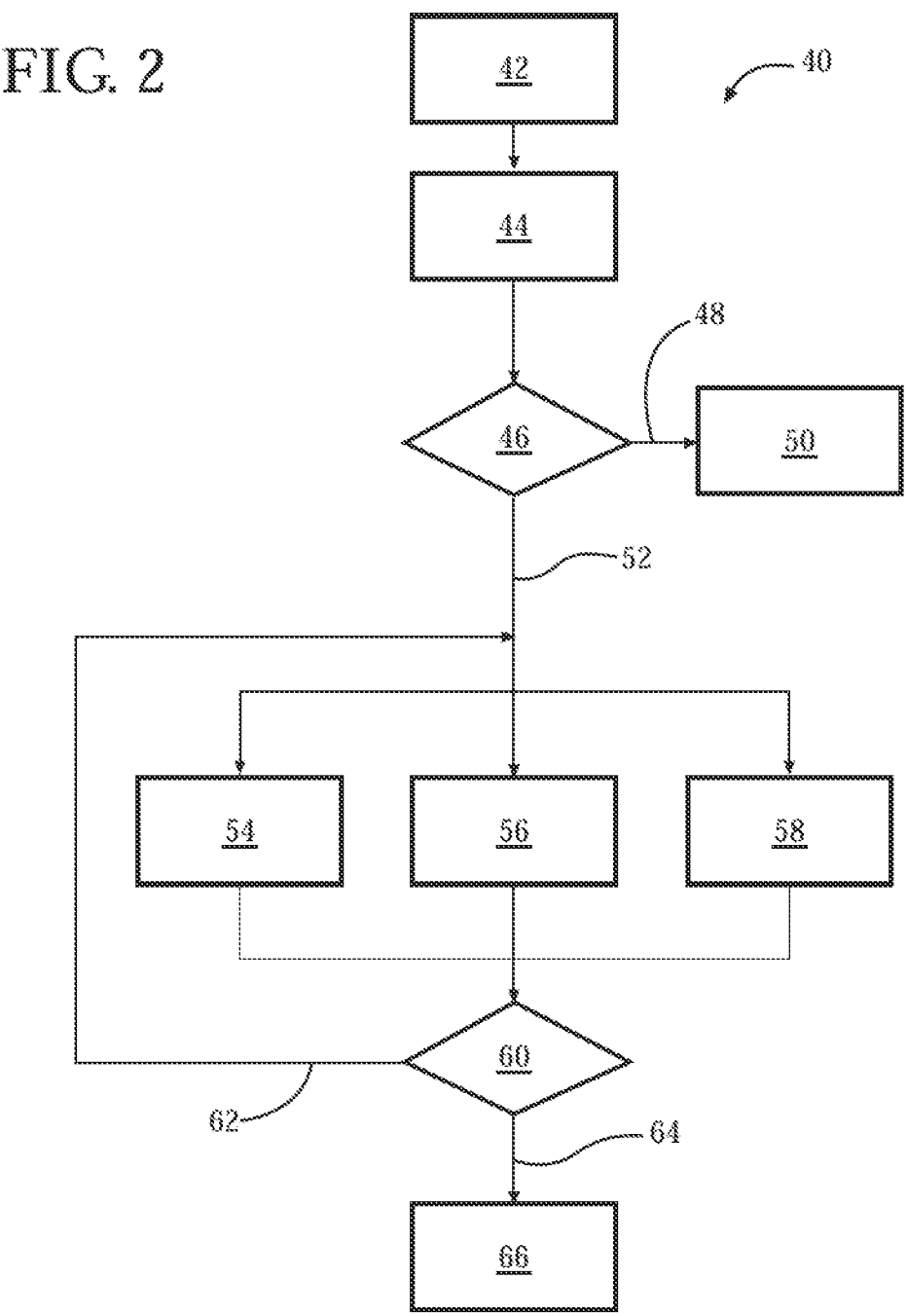

METHOD OF CONTROLLING A DIESEL ENGINE

TECHNICAL FIELD

The invention generally relates to a method of controlling the operation of a diesel engine of a vehicle.

BACKGROUND

Diesel engines operate by compressing air, including oxygen, within a combustion chamber with a piston, and then injecting fuel, which includes hydrocarbons, into the compressed air. Because the air heats up during compression, the fuel ignites upon being injected into the compressed air.

Some failure modes of various components of diesel engines, such as a turbocharger, may introduce hydrocarbons into the flow of air provided to an intake manifold, which are then circulated into the combustion chamber and combusted. Alternatively, a fuel injection system may malfunction and remain stuck open, continuing to inject fuel into the combustion chamber. Some other conditions may also result in uncontrolled hydrocarbon introduction into the combustion chamber. These other conditions may include but are not limited to an over-dose of starting fluid, overfill of engine lubrication oil, or severe lubrication oil/fuel dilution. These hydrocarbon based contaminants may allow the diesel engine to continue operating even after the controlled fuel supply to the engine is disengaged. This situation may lead to the diesel engine continuing to accelerate in rotational speed, and may be referred to as a "runaway" situation.

SUMMARY

A method of controlling a diesel engine of a vehicle is provided. The method includes sensing a speed of the diesel engine. When the sensed speed of the diesel engine is equal to or greater than a maximum allowable engine speed, a throttle of the diesel engine is closed to prevent oxygen from entering an intake manifold of the diesel engine. Additionally, an Exhaust Gas Recirculation (EGR) valve is actuated to regulate circulation of exhaust gas from the diesel engine through the intake manifold to control pressure within the intake manifold. The EGR valve is actuated when the throttle is closed in response to the sensed speed of the diesel engine being equal to or greater than the maximum allowable engine speed.

A method of controlling a vehicle having a diesel engine is also provided. The method includes providing a control module operable to control the operation of the diesel engine. The control module is configured to sense a speed of the diesel engine, and determine if the sensed speed of the diesel engine is less than, equal to or greater than a maximum allowable engine speed. When the sensed speed of the diesel engine is equal to or greater than the maximum allowable engine speed, a throttle of the diesel engine is closed to prevent oxygen from entering an intake manifold. When the throttle is closed in response to the sensed speed of the diesel engine being equal to or greater than the maximum allowable engine speed, an Exhaust Gas Recirculation (EGR) valve is actuated to regulate circulation of exhaust gas from the diesel engine through the intake manifold to control pressure within the intake manifold. The throttle is maintained in the closed position to block the flow of oxygen into the intake manifold, and the actuation of the EGR valve is continued to regulate circulation of exhaust gas from the diesel engine through the intake manifold to control the pressure within the intake manifold until the sensed speed of the engine is below a lower limit. The throttle is closed and the EGR valve is regulated until the engine speed is below the lower limit to stop the operation of the diesel engine.

Accordingly, when the sensed speed of the diesel engine is equal to or greater than the maximum allowable engine speed, thereby indicating a runaway situation, the control module closes the throttle to starve the diesel engine of oxygen, thereby preventing combustion even with the presence of hydrocarbons. The throttle is maintained closed until the sensed speed of the diesel engine falls below the lower limit, thereby stopping operation of the diesel engine. The EGR valve is actuated to control the pressure, either positive pressure or negative pressure, within the intake manifold created by closing the throttle while the engine is operating, thereby preventing damage to other engine components from excessive intake manifold vacuum or pressure differential buildup.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a flowchart showing a method of controlling the diesel engine.

DETAILED DESCRIPTION

Figure 1:
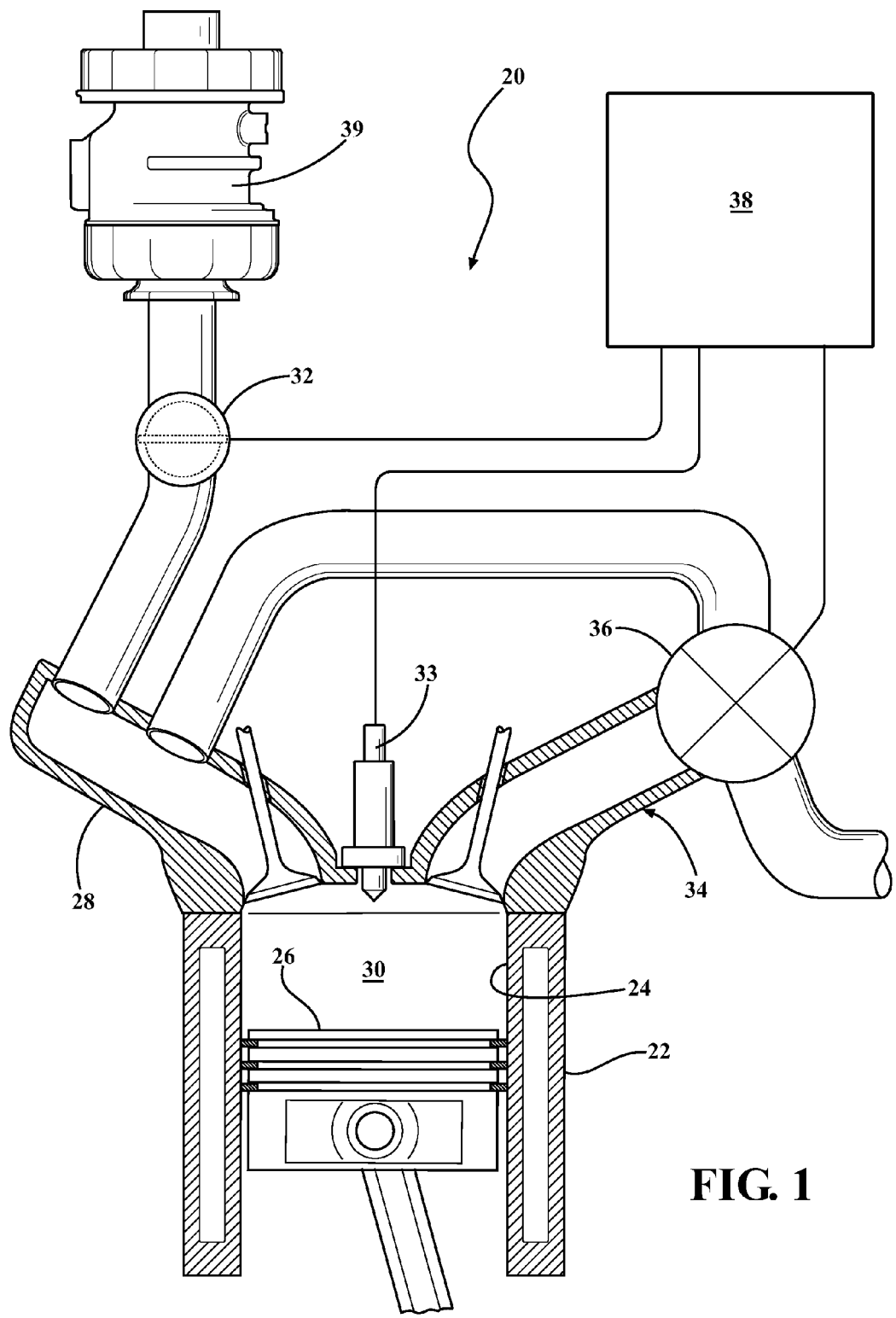
FIG. 1 is a schematic partially cross sectioned diagram of a diesel engine.

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a diesel engine is generally shown at 20. The diesel engine 20 is for a vehicle, and includes all components and operates in a manner known for a diesel engine 20.

Generally, the diesel engine 20 includes an engine block 22 defining a plurality of bores 24, with each bore having a piston 26 moveable therein. An intake manifold 28 is operable to supply compressed air to a combustion chamber 30 of each of the bores 24 as is known for diesel engines 20. The intake manifold 28 includes a throttle 32, which regulates the flow of compressed air to each of the combustion chambers 30. As known with diesel engines 20, the fuel is injected via a fuel injector 33 into the combustion chambers 30 independently of the combustion air, and combusts in response to the heat of the compressed air when the piston 26 is precisely positioned within the bore. The throttle 32 is moveable to any position between and including a fully open position and a fully closed position. When in the fully closed position, the throttle 32 closes fluid communication with the combustion chambers 30 to prevent the flow of air and oxygen supply through the intake manifold 28 and into each of the combustion chambers 30.

Exhaust gases from the combustion chamber 30 are exhausted through an exhaust gas system 34. The exhaust gas system 34 may include an Exhaust Gas Recirculation (EGR) valve 36, which regulates fluid communication between the exhaust gas system 34 and the intake manifold 28 to allow a portion of the exhaust gases flowing through the exhaust gas system 34 to be directed through the intake manifold 28 and back into the combustion chamber 30 as is known in the art. The EGR valve 36 is moveable to any position between and including a fully open position and a fully closed position. When in the fully closed position, the EGR valve 36 closes fluid communication between the exhaust gas system 34 and the intake manifold 28 to prevent the flow of exhaust gases from the exhaust gas system 34 into the intake manifold 28.

The vehicle may include a control module 38, such as but not limited to an engine control unit, to control the operation of the diesel engine 20 including the injection of fuel into the combustion chambers 30, as well as the operation of the throttle 32 and the EGR valve 36. The control module 38 may include a computer and/or processor, and include all software, hardware, memory, algorithms, connections, sensors, etc., necessary to manage and control the operation of the diesel engine 20. As such, a method, described below and generally shown in FIG. 2 at 40, may be embodied as a program operable on the control module 38. It should be appreciated that the control module 38 may include any device capable of analyzing data from the various sensors, comparing data, making the necessary decisions required to control the operation of the diesel engine 20, and executing the required tasks necessary to control the operation of the diesel engine 20.

Referring to FIG. 2, the method of controlling the operation of the diesel engine 20 is generally shown at 40. The method includes providing the control module 38 operable to control the operation of the diesel engine 20. As noted above, the control module 38 includes all software, hardware, memory, algorithms, connections, sensors, etc. necessary to manage and control the operation of the diesel engine 20. The control module 38 is configured to perform the various tasks of the method described below.

The method described below is targeted to control the operation of the diesel engine 20 when a runaway event is detected. As defined herein, a runaway event includes any instance when the control module 38 detects the speed of the diesel engine 20, i.e., the revolutions per minute of the diesel engine 20, is greater than is expected under any possible normal operating condition. As an example, a runaway event may occur in response to a failure of a turbocharger 39 in which the turbocharger 39 is uncontrollably leaking hydrocarbon based fluids into the flow of compressed air which is directed into the combustion chambers 30. In such a situation, the diesel engine 20 may combust the uncontrolled, leaked hydrocarbons from the failed turbocharger, causing the diesel engine 20 to continue to run and accelerate, even when the injection of fuel has been stopped. The runaway event may cause the diesel engine 20 to rev to mechanical failure. While the above described situation is an example of a runaway event, it should be appreciated that a runaway event may be caused by many other incidents. The below described method provides a strategy to stop the operation of the diesel engine 20 when the diesel engine 20 is in a runaway situation, prior to any damage to the diesel engine 20 occurring.

In order to identify the runaway event, the method includes defining a maximum allowable engine speed, generally indicated by box 42. The maximum allowable engine speed is defined to include a value greater than an expected maximum threshold engine speed. The maximum threshold engine speed is a speed of the diesel engine 20 that is not expected to ever occur during normal operating conditions, including such conditions as an overrun down a steep grade. The maximum allowable engine speed may be defined as a constant stored in the memory of the control module 38, and may be defined a value suitable for the particular vehicle and engine. Accordingly, different sizes and/or styles of vehicles having different sizes of diesel engines 20 may each have a different value for the maximum allowable engine speed.

A speed of the diesel engine 20 is sensed, generally indicated by box 44, and communicated to the control module 38. The speed of the diesel engine 20 may be sensed in any suitable manner, including but not limited to sensing the speed with a sensor. Alternatively, the speed of the diesel engine 20 may be communicated to the control module 38 from some other computer/processor of the vehicle.

The control module 38 then determines if the sensed speed of the diesel engine 20 is less than, equal to or greater than the maximum allowable engine speed, generally indicated by box 46. If the sensed speed is less than the maximum allowable engine speed, generally indicated at 48, then the control module 38 determines that a runaway event does not exist, and no action is taken, generally indicated by box 50. If the sensed speed is equal to or greater than the maximum allowable engine speed, generally indicated at 52, then the control module 38 determines that the diesel engine 20 is in a runaway event, and implements the below described strategy to stop the operation of the diesel engine 20.

When the sensed speed of the diesel engine 20 is equal to or greater than the maximum allowable engine speed, thereby indicating a runaway event, then the control module 38 stops the injection of fuel into the combustion chambers 30, generally indicated by box 54, and closes the throttle 32 of the diesel engine 20, generally indicated by box 56, to prevent oxygen, i.e., the combustion air, from entering the intake manifold 28 of the diesel engine 20. Closing the throttle 32 starves the combustion chambers 30 of the oxygen required to combust. Without the oxygen, combustion within the combustion chambers 30 cannot occur, thereby allowing the diesel engine 20 to stop operating. However, completely closing the throttle 32 to block all air from entering the intake manifold 28 while the pistons 26 are still reciprocating within the bores 24 may create a vacuum in the intake manifold 28, or a high pressure differential between the opposing sides of the throttle 32. This vacuum or high pressure differential, if left un-regulated, may damage various components of the diesel engine 20, such as the intake manifold 28, or the intake throttle 32.

Accordingly, when the throttle 32 is closed in response to the sensed speed of the diesel engine 20 being equal to or greater than the maximum allowable engine speed, the EGR valve 36 is actuated, generally indicated by box 58, to regulate circulation of exhaust gas from the diesel engine 20 through the intake manifold 28 to control pressure within the intake manifold 28. Because the exhaust gas from the exhaust gas system 34 has been through the combustion cycle, the exhaust gas is theoretically void of any combustible oxygen. Accordingly, circulating the exhaust gas through the intake manifold 28 will not provide the combustion chambers 30 with any oxygen for combustion. Actuating the EGR valve 36 includes continuously modulating the EGR valve 36 to maintain the pressure in the intake manifold 28 above a minimum allowable pressure limit. Modulating the EGR valve 36 includes opening the EGR valve 36 to allow more exhaust gas into the intake manifold 28 to increase the pressure within the intake manifold 28, and closing the EGR valve 36 to restrict exhaust gas from entering the intake manifold 28 to allow the pressure within the intake manifold 28 to decrease. The EGR valve 36 continuously adjusts to a position between and including the fully open position and the fully closed of the EGR valve 36. As such, the EGR valve 36 may be positioned in the fully open position, the fully closed position, or in any position between the fully open position and the fully closed position in order to provide the correct amount of exhaust gas to the intake manifold 28 to regulate the pressure therein. The control module 38 controls the position of the EGR valve 36 so that the pressure within the intake manifold 28 stays at or above a minimum pressure.

The control module 38 continues to maintain the throttle 32 in the closed position to block the flow of oxygen into the intake manifold 28, and continues to actuate the EGR valve 36 to regulate circulation of exhaust gas from the diesel engine 20 through the intake manifold 28, until the control module 38 determines that the speed of the engine is below a lower limit, generally indicated by box 60. The lower limit is a speed of the diesel engine 20 at which the diesel engine 20 will not re-start. As such, if the speed of the diesel engine 20 is greater than the lower limit, as indicated at 62, then the possibility exists that the diesel engine 20 may re-start and take off on the runaway event again, and the control module 38 maintains the control strategy to stop the operation of the diesel engine 20. However, if the speed of the diesel engine 20 is below the lower limit, generally indicated at 64, then the diesel engine 20 is not able to re-start, and the runaway event is stopped. For example, the lower limit may be defined to include an engine speed between the range of 0 and 100 revolutions per minute. More preferably however, the lower limit is defined as equal to zero revolutions per minute.

When the speed of the diesel engine 20 is below the lower limit, generally indicated at 64, then the method includes preventing initiation of at least one after-run function of the diesel engine 20, generally indicated by box 66, after the operation of the diesel engine 20 has been stopped in response to the sensed speed of the vehicle being equal to or greater than the maximum allowable engine speed. As used herein, an after-run function is defined as a function that occurs when engine speed comes down to zero and an ignition key is in an off position, an includes the engine control unit staying alive for a period of time and performing certain special static functions. Examples of after-run functions include but are not limited to some actuator position offset learns; baro-sensor, boost sensor or DPF delta pressure sensor offset learns; diagnostics; and saving soot/NH3 loading, SCR adaption/aging factors to memory. Depending upon the cause of the runaway event, the after-run functions may damage various components of the vehicle or re-start the diesel engine 20 if initiated. Accordingly, at least one of, or some of the after-run functions are prevented from initiating until the cause of the runaway event may be determined and corrected.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a diesel engine of a vehicle, the method comprising:
   providing a control module operable to control the diesel engine;
   sensing a speed of the diesel engine;
   closing a throttle of the diesel engine to prevent oxygen from entering an intake manifold of the diesel engine when the sensed speed of the diesel engine is equal to or greater than a maximum allowable engine speed; and
   actuating an Exhaust Gas Recirculation (EGR) valve to regulate circulation of exhaust gas from the diesel engine through the intake manifold to control pressure within the intake manifold when the throttle is closed in response to the sensed speed of the diesel engine being equal to or greater than the maximum allowable engine speed;
   wherein actuating the EGR valve includes modulating the EGR valve to maintain the pressure in the intake manifold above a minimum allowable pressure limit.

2. A method as set forth in claim 1 further comprising defining the maximum allowable engine speed.

3. A method as set forth in claim 2 wherein defining the maximum allowable engine speed is further defined as defining the maximum allowable engine speed to include a value greater than an expected maximum threshold engine speed.

4. A method as set forth in claim 1 wherein modulating the EGR valve includes opening the EGR valve to allow more exhaust gas into the intake manifold to increase the pressure within the intake manifold.

5. A method as set forth in claim 4 wherein modulating the EGR valve includes closing the EGR valve to restrict exhaust gas from entering the intake manifold to allow the pressure within the intake manifold to decrease.

6. A method as set forth in claim 1 wherein modulating the EGR valve includes continuously adjusting the EGR valve to a position between a fully open position and a fully closed position.

7. A method as set forth in claim 1 further comprising continuing to maintain the throttle in the closed position to block the flow of oxygen into the intake manifold and continuing to actuate the EGR valve to regulate circulation of exhaust gas from the diesel engine through the intake manifold until the speed of the engine is below a lower limit to stop the operation of the diesel engine.

8. A method as set forth in claim 7 wherein the lower limit of the engine speed is between the range of 0 and 100 revolutions per minute.

9. A method as set forth in claim 8 wherein the lower limit of the engine speed is equal to zero revolutions per minute.

10. A method as set forth in claim 7 further comprising preventing initiation of at least one after-run function of the diesel engine after the operation of the diesel engine has been stopped in response to the sensed speed of the vehicle being equal to or greater than the maximum allowable engine speed.

11. A method of controlling a vehicle having a diesel engine, the method comprising:
    providing a control module operable to control the operation of the diesel engine, wherein the control module is configured for:
    sensing a speed of the diesel engine;
    determining if the sensed speed of the diesel engine is less than, equal to or greater than a maximum allowable engine speed;
    closing a throttle of the diesel engine to prevent oxygen from entering an intake manifold of the diesel engine when the sensed speed of the diesel engine is equal to or greater than the maximum allowable engine speed;
    actuating an Exhaust Gas Recirculation (EGR) valve to regulate circulation of exhaust gas from the diesel engine through the intake manifold to control pressure within the intake manifold when the throttle is closed in response to the sensed speed of the diesel engine being equal to or greater than the maximum allowable engine speed;
    continuing to maintain the throttle in the closed position to block the flow of oxygen into the intake manifold and continuing to actuate the EGR valve to regulate circulation of exhaust gas from the diesel engine through the intake manifold until the sensed speed of the diesel engine is below a lower limit to stop the operation of the diesel engine; and preventing initiation of at least one after-run function of the diesel engine after the operation of the diesel engine has been stopped in response to the sensed speed of the vehicle being equal to or greater than the maximum allowable engine speed.

12. A method as set forth in claim 11 further comprising defining the maximum allowable engine speed to include a value greater than an expected maximum threshold engine speed.

13. A method as set forth in claim 11 wherein actuating the EGR valve includes modulating the EGR valve to maintain the pressure in the intake manifold above a minimum allowable pressure limit.

14. A method as set forth in claim 13 wherein modulating the EGR valve includes opening the EGR valve to allow more exhaust gas into the intake manifold to increase the pressure within the intake manifold, and includes closing the EGR valve to restrict exhaust gas from entering the intake manifold to allow the pressure within the intake manifold to decrease.

15. A method as set forth in claim 13 wherein modulating the EGR valve includes continuously adjusting the EGR valve to a position between a fully open position and a fully closed position.

16. A method as set forth in claim 11 wherein the lower limit of the engine speed is between the range of 0 and 100 revolutions per minute.

17. A method as set forth in claim 16 wherein the lower limit of the engine speed is equal to zero revolutions per minute.

\* \* \* \* \*